US012686457B2

(12) United States Patent　　　　　(10) Patent No.:　US 12,686,457 B2
Weidman et al.　　　　　　　　　　　(45) Date of Patent:　　Jul. 21, 2026

(54) LOCKING STORAGE AND SUPPORT DEVICE AND METHOD

(71) Applicant: 2SG, LLC, Ormond Beach, FL (US)

(72) Inventors: Scott Weidman, Daytona Beach, FL (US); Ian Anderson, Ormond Beach, FL (US)

( * ) Notice: Subject to any disclaimer, the term of this patent is extended or adjusted under 35 U.S.C. 154(b) by 722 days.

(21) Appl. No.: 18/001,996

(22) PCT Filed: Jul. 14, 2022

(86) PCT No.: PCT/US2022/073750

§ 371 (c)(1),
(2) Date: Dec. 15, 2022

(87) PCT Pub. No.: WO2023/288286

PCT Pub. Date: Jan. 19, 2023

(65) Prior Publication Data

US 2024/0067292 A1　　Feb. 29, 2024

Related U.S. Application Data

(60) Provisional application No. 63/203,275, filed on Jul. 15, 2021.

(51) Int. Cl.
| | |
|---|---|
| *B62J 9/30* | (2020.01) |
| *B65D 21/02* | (2006.01) |
| *B65D 25/22* | (2006.01) |
| *B65D 43/16* | (2006.01) |
| *B65D 51/24* | (2006.01) |
| *B65D 55/14* | (2006.01) |

(52) U.S. Cl.
CPC ............ *B62J 9/30* (2020.02); *B65D 21/0217* (2013.01); *B65D 25/22* (2013.01); *B65D*

*43/16* (2013.01); *B65D 51/24* (2013.01); *B65D 55/14* (2013.01); *B65D 2251/1016* (2013.01)

(58) Field of Classification Search
CPC .................................. B62J 9/30; B65D 55/14
See application file for complete search history.

(56) References Cited

U.S. PATENT DOCUMENTS

| | | | | |
|---|---|---|---|---|
| 676,443 | A | * | 6/1901 | Parish .................. A47B 23/042 |
| | | | | 248/454 |
| 1,026,649 | A | | 5/1912 | Beshore |
| 1,251,591 | A | | 1/1918 | Stoddart |
| 1,404,263 | A | | 1/1922 | Bludworth |

(Continued)

FOREIGN PATENT DOCUMENTS

| | | |
|---|---|---|
| CN | 206822155 | 6/2017 |

*Primary Examiner* — Derek J Battisti
(74) *Attorney, Agent, or Firm* — Lori Sandman, Esq.

(57)　　　　　　ABSTRACT

The invention disclosed comprises multifunctional, mobile, stackable storage container that features an internal lockable storage area and an external surface area. The device is capable of mounting safely and securely to a beach umbrella, chair, or outdoor fixture; it is further able to securely connect to variety of wheeled vehicles including bikes or wheelchairs. In a preferred embodiment, the invention additionally comprises solar charging and battery storage capability for providing power to a cell phone, a speaker system, and can include other features such as lights, one or more charging ports and outlets, cup holders, Bluetooth or auxiliary powered speakers, and a rechargeable battery backup.

13 Claims, 5 Drawing Sheets

(56)  References Cited

U.S. PATENT DOCUMENTS

| | | | | |
|---|---|---|---|---|
| 1,955,809 | A * | 4/1934 | Hobbs | E05B 65/52 |
| | | | | 70/52 |
| 2,755,748 | A | 7/1956 | Abell | |
| 4,086,795 | A * | 5/1978 | Foster | E05B 73/0011 |
| | | | | 70/49 |
| 7,164,081 | B1 * | 1/2007 | Tollefson | B25H 3/00 |
| | | | | 174/59 |
| 7,641,279 | B1 | 1/2010 | Curcio | |
| 7,743,713 | B2 | 6/2010 | Volk | |
| 9,986,808 | B2 | 6/2018 | Halpern | |
| 10,180,026 | B2 | 1/2019 | Peck | |
| 10,253,547 | B2 | 4/2019 | Peck | |
| 10,329,830 | B2 | 6/2019 | Peck | |
| 10,450,775 | B2 * | 10/2019 | Cagan | E05B 17/226 |
| 10,602,817 | B2 | 3/2020 | Price | |
| 10,932,538 | B2 * | 3/2021 | Wolf | E05B 73/0011 |
| 2004/0045329 | A1 * | 3/2004 | Farnham | E05B 73/0005 |
| | | | | 70/161 |
| 2005/0199019 | A1 * | 9/2005 | Marcelle | E05B 67/00 |
| | | | | 340/541 |
| 2006/0016530 | A1 * | 1/2006 | Volk | A45C 13/18 |
| | | | | 150/101 |
| 2006/0130541 | A1 * | 6/2006 | Tollefson | B60D 1/60 |
| | | | | 70/49 |
| 2011/0315566 | A1 * | 12/2011 | Boynton | A45C 11/16 |
| | | | | 206/459.5 |
| 2014/0182094 | A1 * | 7/2014 | Zuraski | B62H 5/00 |
| | | | | 24/456 |
| 2016/0326765 | A1 * | 11/2016 | Barbret | E04H 15/02 |

* cited by examiner

SECTION A-A

SECTION B-B

LOCKING STORAGE AND SUPPORT DEVICE AND METHOD

CROSS-REFERENCE TO RELATED APPLICATIONS

This application claims the benefit of the prior filing date under 35 U.S.C. § 119(e) of U.S. Provisional Application No. 63/203,275, filed on Jul. 15, 2021.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

The invention disclosed relates to the field of locking storage devices; specifically, it discloses an improved device and method of use for storage and safekeeping of personal items in outdoor environments.

The ability to protect personal items from theft is important, particularly in the outdoors. Theft, loss due to misplacement and damage due to weather or other external impacts can destroy property; items such as keys, cell phones, tablets or handheld computing devices, cosmetics, wallets, and medications can be stolen or ruined if left outside. Present solutions include a wide variety of locking storage containers, but for various reasons they fall short in specific environments, including at the beach or when riding on bicycles, scooters, SEGWAY® devices, wheelchairs and other types of personal wheeled vehicles.

Devices that lock personal items to beach chairs, bicycles or umbrellas come in a number of sizes and shapes. However, many solutions are bulky or cumbersome, or require multiple engaging parts. Portable solutions that are easy to store and transport are either too small to effectively store personal items, or are not water or weather resistant, so items such as phones, watches and small portable electronic equipment will sit in water that has entered the compartment and be ruined. Also, some currently available storage containers are vertically disposed and configured to attach horizontally, so they are not usable with a anchoring devices that are vertical, such as beach umbrellas, posts, bike or scooter frames, etc.

One challenge associated with outdoor activity, particularly the beach, is finding a surface area to put personal or service items on. Drinking cups or glasses, eyewear, hats and electronic devices such as phones, iPads or tablets or other personal items that are used while outdoors can get lost, stepped on or otherwise ruined if they are on the ground or on a chair or blanket. It is desirable to have a portable outdoor surface area and associated storage compartment capable of keeping items in and on, so that they can be protected while still being easily accessed.

Another challenge that can arise from outdoor activity is damage to personal items and equipment. Various solutions to the persistent problems of damage to personal items during outdoor activity exist. Locking storage solutions have been disclosed that include flexible bags that can be secured and attached to stationary objects. Portable, lockable security boxes that fasten to an elongate object or support member have also been described. These solutions rely on a hinge mechanism, and typically surround a separate object in order to secure to it. Consequently, the lid of device has to be opened in order to detach it from an object. Because of this, many of these solutions are not appropriate for securing to a vertical object, such as a beach umbrella, and are only useful if they can be attached to a horizontally positioned external object.

Although there are storage containers that have been described as capable of attaching to an object in an outdoor environment, stability concerns persist. The weight of a surface or storage area with personal items in or on it can challenge efficacy of a portable, mountable device. Various approaches have targeted the problem of stability inherent with removeably attaching a storage device to a portable object. However, none are configured with an internal attachment and stabilizing system to connect with and stabilize the supporting object.

What is needed is a sturdy, safe, stable and releasably attachable outdoor surface area and associated locked storage area capable of keeping items in or on, so that they can be protected while still being easily accessed. This would be particularly helpful and effective at the beach, where heat, sand and water can harm items. An important improvement would be the capability to attach to a vertically positioned external or anchoring object such as a beach umbrella, portable shelter pole, or a personal wheeled vehicle.

BRIEF SUMMARY OF THE INVENTION

The device comprises a multifunctional, mobile and stackable storage container that features a lockable storage area capable of mounting safely and securely to beach umbrellas, chairs, outdoor fixtures or personal wheeled vehicles including bicycles, scooters, SEGWAY® devices, and wheelchairs. In a preferred embodiment, the invention further comprises solar charging and battery storage capability for providing power to a cell phone, a speaker system, and can include other features such as lights, one or more charging ports and outlets, cup holders, Bluetooth or auxiliary powered speakers, and a rechargeable battery backup. The device is sized to accommodate and specifically include surface area for and storage of larger items including iPads or tablets.

In one embodiment the device is a single locking storge and support device that attaches via a U-shaped shackle capable of reversibly sliding into the device and engaging with a ratcheting system, which also engages with an external solid, anchoring object. The attachment system is accessible inside the box when it is unlocked. In a different embodiment, the device is attachably connected with a second box, expanding the capacity of the first, single embodiment and providing a second, separate lockable storage and surface area.

It is an object of the invention to provide multifunctional, mobile, stackable storage containers that feature an internal lockable storage area and an external surface area.

It is another object of the invention to provide a lockable storage and surface space capable of mounting safely and securely to a beach umbrella, chair, or outdoor fixture.

It is a separate object of the invention to securely connect a lockable storage and surface space to support and secure personal items on variety of personal wheeled vehicles including but not limited to bicycles, scooters, SEGWAY® devices, and wheelchairs.

It is a different object of the invention to provide a lockable storage and surface space with the capacity for solar charging and battery storage capability for providing power to a cell phone, a speaker system, and can include other features such as lights, one or more charging ports and outlets, cup holders, Bluetooth or auxiliary powered speakers, and a rechargeable battery backup.

REFERENCE CHARACTER USED IN THE DRAWINGS

1. Box lid
2. Box body
3. Shackle
4. Lock
5. Support channel
6. Cup supports
7. Surface area
8. Ratcheting means
9. Support sleeve
10. Support sleeve post
11. Support sleeve aperture
12. Stabilizer
13. Stabilizer post
14. Stabilizer fastener
15. Loop lock
16. panel

DESCRIPTION OF THE INVENTION

Figure 1:
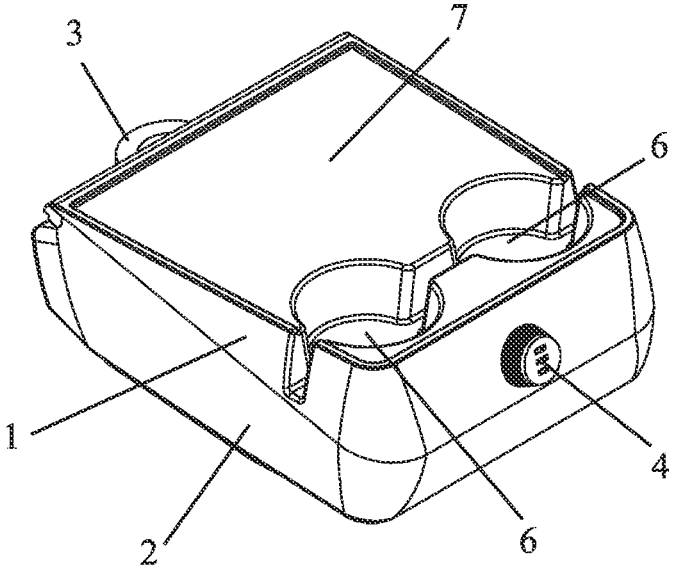
FIG. 1 is a perspective view of the device of the invention.

This summary broadly describes some of the features of the locking storage and support device and method in order that this description of the invention may be better understood, and so that the present contribution to the art may be better appreciated. There are additional features of the invention that will be described hereinafter and that will form the subject matter of the claims appended hereto. In this respect, before explaining at least one embodiment of the invention in detail, it is to be understood that the invention as herein described is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

In FIG. 1, a perspective view of the device of the invention is shown. A portable and lockable box for storing and supporting personal items is shown. A box lid 1 is attached to a box body 2 via one or more hinges that allow the box lid 1 to swing onto or away from the box body 2, rendering the device open or closed to the external environment. The box body 2 may comprise a plurality of sides; on one side of the box body 2, water and weather resistant apertures in the box body 2 allow a shackle 3 to pass through from the outside to the inside of the box body 2. The apertures may be sized with little or no gap space to minimize intrusion, rubberized or lined with a reflexive material to assure water and weather resistance. The shackle 3 is removeably inserted into the box body 2 by passing it through said apertures, where it is supported and held in place by a ratcheting means 8. A plurality of grooves or ridges on the shackle 3 interact with the ratcheting means 8 mounted to the box body 2. The ratcheting means 8 contains a release component that is only accessible from inside the box body 2, thereby rendering the device secure when closed and locked with a lock 4 from the outside.

The surface area 7 is flat portion of the box lid 1 and can accommodate a range of personal items, including cell phones, personal computing devices, keys, iPads, sunscreen, etc. This surface area 7 also supports and is capable of stacking with a plurality of other devices of the invention, as further illustrated in FIG. 2. The box lid 1 and surface area 7 may also have one or more cup supports 6 within it that are capable of holding cans, cups or bottled drinks; other receiving compartments of various shapes could optionally be included and remain within the scope of this disclosure. Also, the box lid or the box body can include speakers for amplifying and projecting sound from external devices. Additional optional features of the device include solar panels for capturing power, batteries for storing power, lighting or light ports, and outlets for connecting power from and to external sources. These allow for power to be connected with the device and used for powering personal items.

In a preferred embodiment, the shackle 3 is substantially in the form of a U-bolt, and is fabricated with stainless steel, aluminum, or similar strong, durable, and sturdy materials. It slides into the box body 2 through water and weather-resistant apertures, and the ridges, grooves or a combination of interacting structural elements matingly conform to and interact with a ratcheting means 8 inside the box body 2. The ratcheting means 8 is only accessible from inside the box, and contains a release component also only accessible from inside the box body 2 when it is unlocked. On the outside, the shackle 3 gets firmly placed around and ratcheted to an umbrella, personal wheeled vehicle or other stable outdoor object (the anchoring object) and locks the device in place, allowing it to serve as a safe as well as a table.

In a different embodiment, a second, separate device with the shackle 3 already attached and in place matingly conforms to the first box body 2. The two boxes slide together to lock in place. One or more of the boxes could be optionally Bluetooth enabled with one or more speakers molded into or attached onto the device, and these speakers could be paired to synchronize and amplify sound. A solar charger and battery for power storage can optionally be added, rendering the invention capable of capturing continuous energy to power speakers, personal electronic device charging ports or other power-actuated devices.

The device including the box lid and the box body are weather and water resistant, and are capable of safely storing contents against outdoor environmental impacts.

Figure 2:
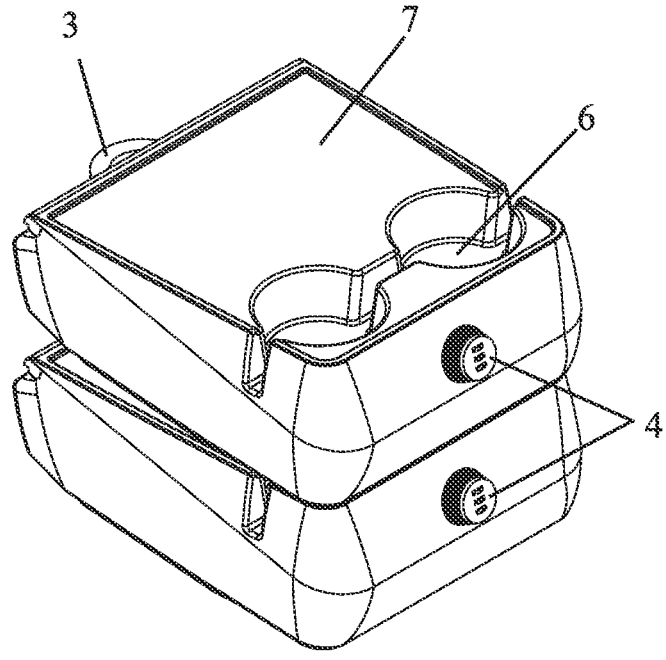
FIG. 2 is a perspective view of the device of the invention in a stackable configuration.

In FIG. 2, a perspective view of the device of the invention in a stackable configuration is shown. A bottom portion of a first device conforms to the top of a second device such that a plurality of the devices can be stacked upon each other for easy storage and transportation. The shackle 3 on the back part of the box body 2 engages the device with a beach umbrella, chair, or other anchoring object when in use; when stacked, multiple of the devices can be locked by locking the closed boxes together, for example with a flexible cord lock, and securing to an external anchoring object. The lock 4 can be any type of locking apparatus that provides a way to secure the box lid 1 to the box body 2; in a preferred embodiment, a resettable combination lock allows users to set individual combinations for security, and the combination can later be reset by a subsequent user with a new, secure combination. The flat surface area 7 provides stability for stacking during storage.

Figures 3, 4, 5:
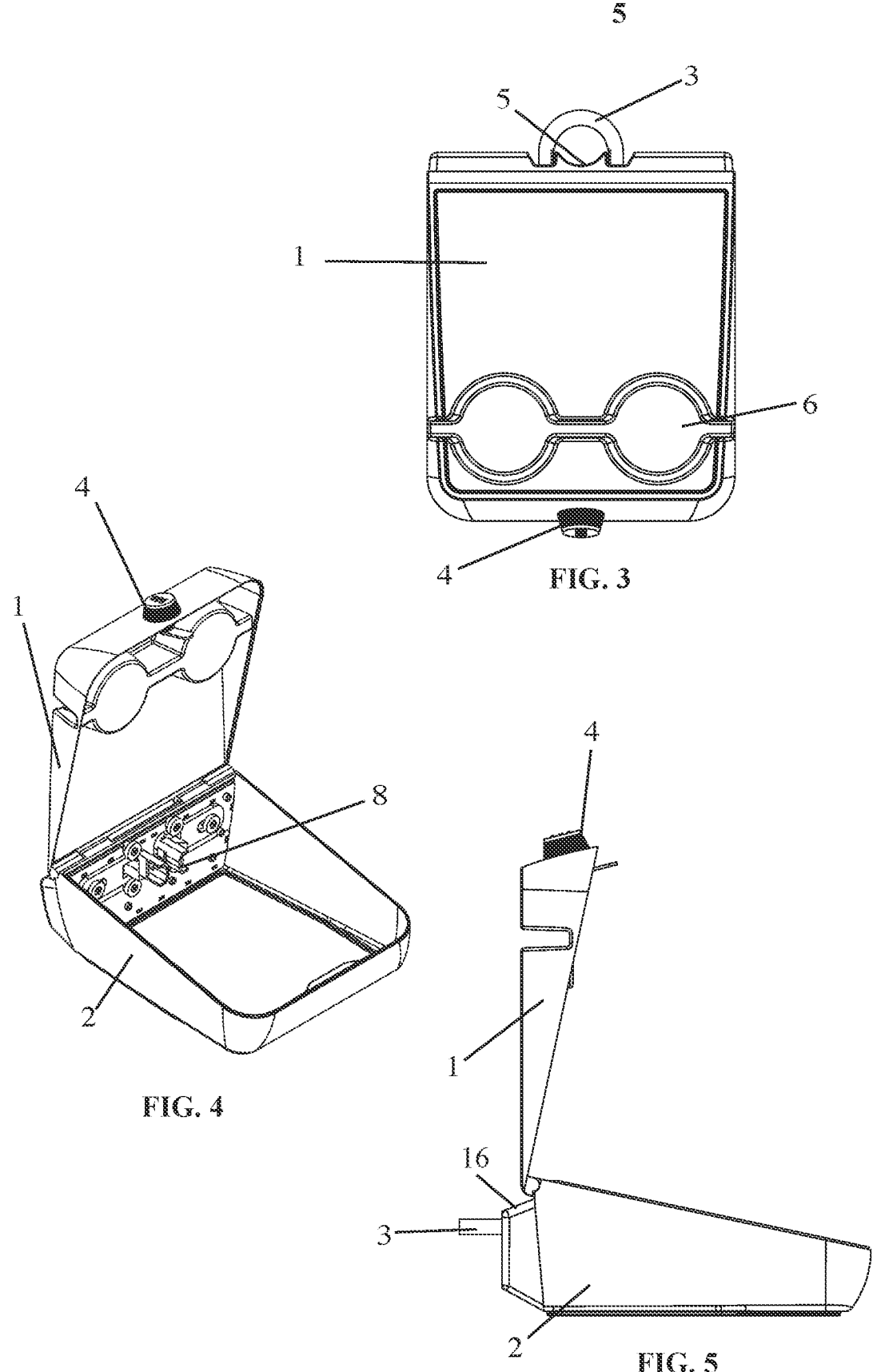
FIG. 3 is a top view of the device of the invention.
FIG. 4 is a perspective view of the inside of the device of the invention with the lid attached and open.
FIG. 5 is a side view of the invention with the lid attached and open.

FIG. 3 shows a view of the device of the invention from the top. In the embodiment depicted, cup supports 6 are formed into the box lid 1. A support channel 5 is also formed into the box lid 1 and box body 2; when the shackle 3 is tightened against the anchoring object, the support channel 5 conforms to and stabilizes the device against the anchoring object. In this embodiment, a combination lock 4 is positioned at the opposite side of the box body 2 from the shackle 3 so that the box lid 1 can be easily and conveniently opened and locked.

FIG. 4 is a perspective view of the inside of the device of the invention with the box lid 1 attached and open. A ratcheting means 8 enables the shackle 3 to be removeably secured manually to an anchoring object when the device is in the open configuration (with the box lid 1 not positioned and locked to the box body 2 with the lock 4). When the box lid 1 is secured and locked to the box body 2 with the lock 4, the ratcheting means 8 is inside and not accessible, thereby locking the device to the anchoring object.

FIG. 5 shows a view of the device of the invention from the side. The hinged box lid 1 swings up from the box body 2 on hinges, revealing the ratcheting means 8 (not shown) inside of the box body 2. The box lid 1 is capable of locking to the box body 2 via the lock 4. One skilled in the art would appreciate that other types of locking devices might be appropriate to lock the box lid 1 to the box body 2, such as Bluetooth, padlocks, or similar, and would still be contemplated within this disclosure.

The box body 2 is connected to the box lid 1 via one or more hinges such that the box lid 1 can be opened, closed and locked by rotating the box lid 1 up or down relative to the box body 2 and aligning the box body 2 with the box lid 1 so as to allow a lock 4 to engage both the box body 2 and the box lid 1 and secure them together. In an embodiment of the invention, one of a plurality of sides of the box body 2 further comprises a removeable panel 16. In this embodiment, a panel 16 is capable of interacting with at least one of the box body 2 sides and also of interacting with the anchoring object. The panel may further comprise one or more support channels 5, which may be in the form of grooves, slides, or other formed or continuous structural areas that interact with the anchoring object. Support channels 5 may be lined with a cushioned area, strip or section of rubber, silicon, or other sturdy but reflexive material by attaching it therein to the channel to help conform to the anchoring object.

Figure 6A:
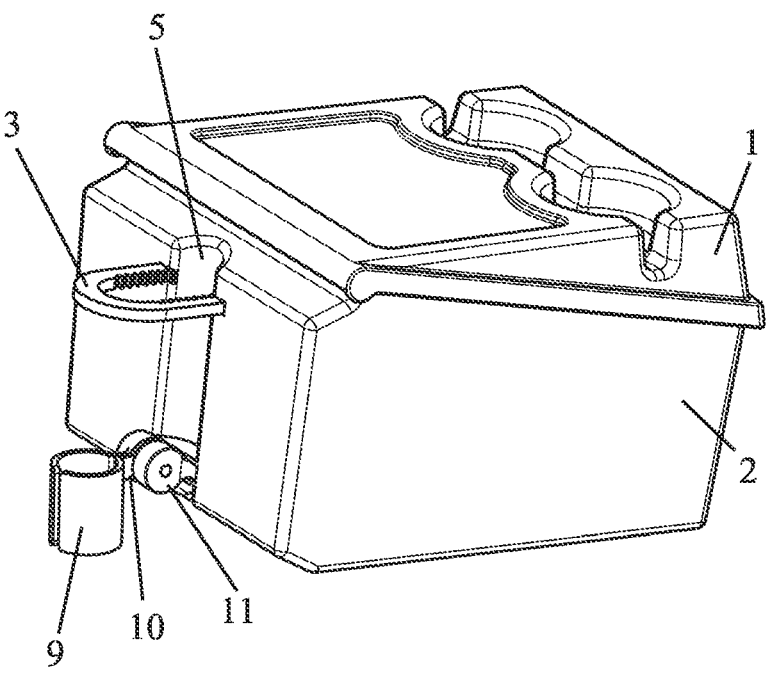
FIG. 6(a) is an assembly view of an embodiment of the device.
Figure 6B:
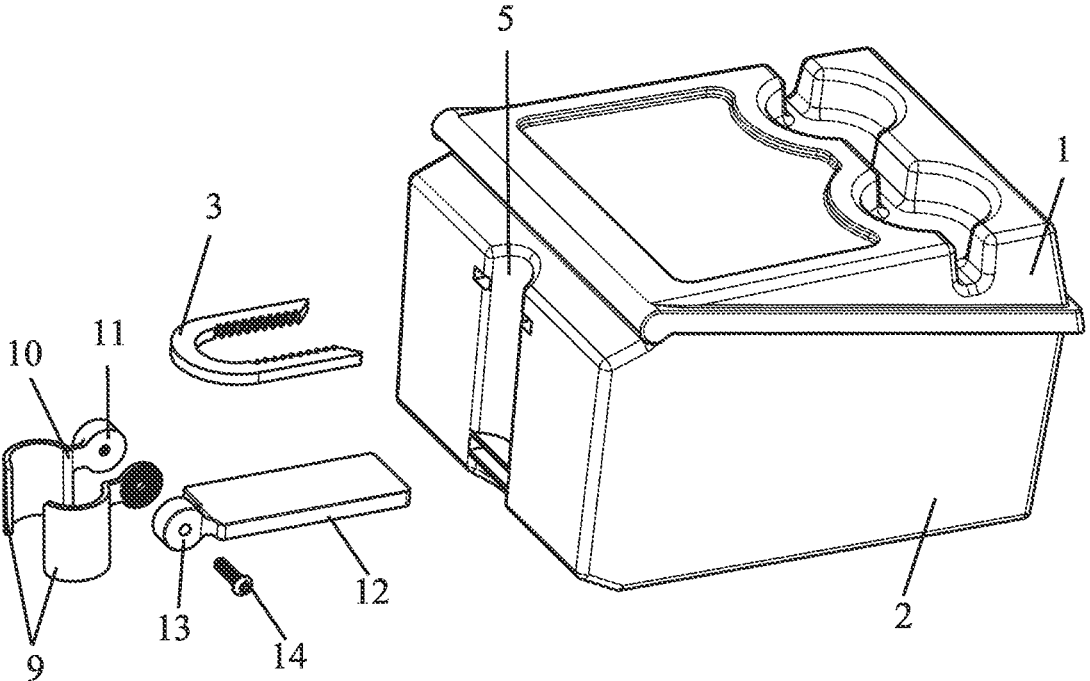
FIG. 6(b) is an exploded view of the embodiment presented in FIG. 6(a).

In FIGS. 6(*a*) and (*b*), a perspective and assembly view of a preferred embodiment of the device is depicted. In this figure, the box body 2 is shown from a side that interacts with the anchoring device. The device comprises a plurality of sides, a bottom, and an open top conforming to the box lid 1. At least one of the plurality of sides may include a panel 16 capable of secure, tight contact with both the box body side and also with the anchoring object. The panel may include one or more support channels 5, which may include grooves, slides, or other formed or continuous structural areas that interact with the anchoring object.

In the embodiment depicted in FIGS. 6, a semi-circular support channel 5 is shown. The support channel 5 may be lined with a cushioning strip or section of rubber, silicon, or other sturdy but reflexive (capable of compression or expansion and subsequently returning to an original configuration) material by attaching it therein to the channel to help conform to the anchoring object, thereby assuring firm contact. One skilled in the art would appreciate that a variety of shaped or configured support channels 5, either lined or unlined, could be used and still considered within the scope of this invention.

Figure 7A:
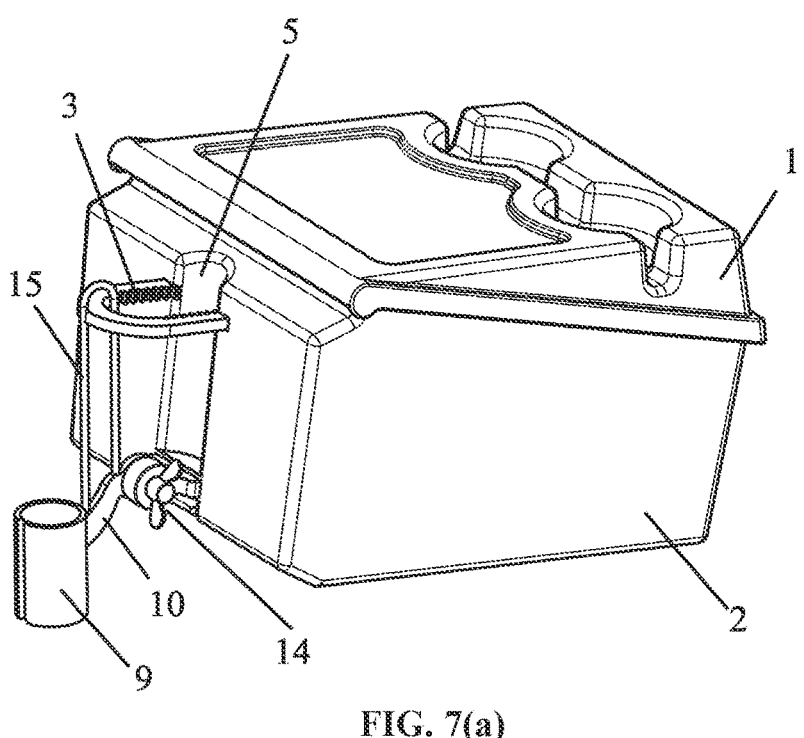
FIG. 7(a) is an assembly view of an embodiment of the device for use with a personal wheeled vehicle.
Figure 7B:
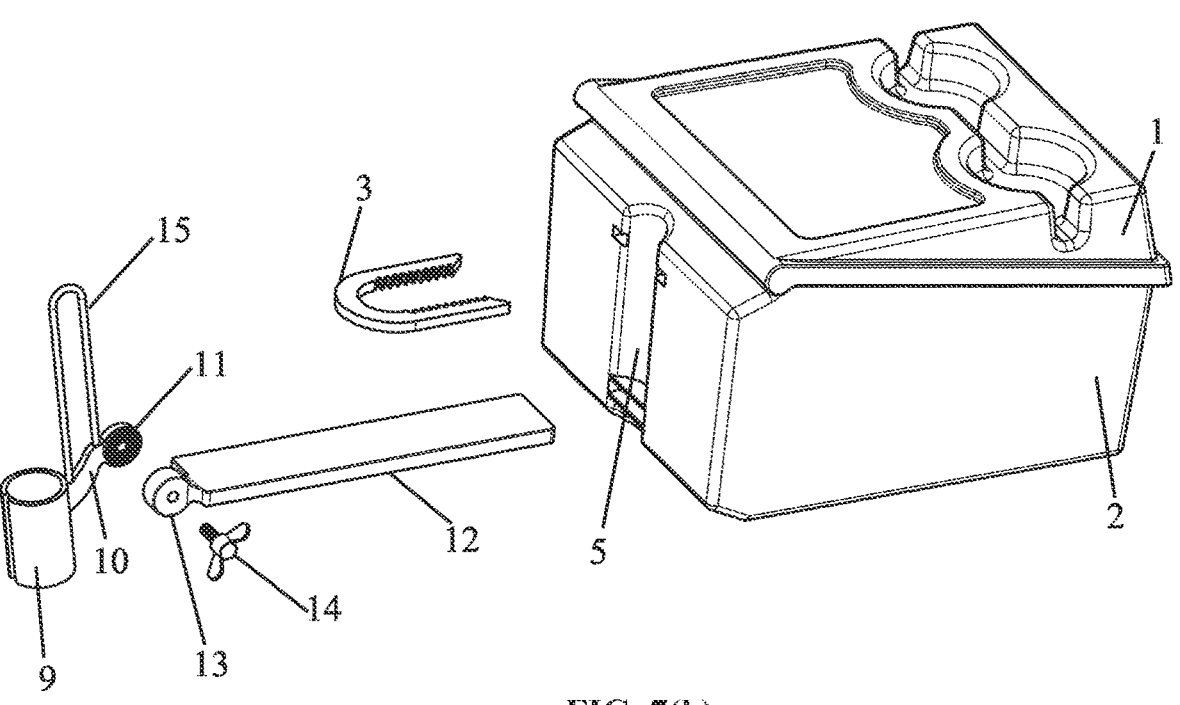
FIG. 7(b) is an exploded view of the embodiment presented in FIG. 7(a).

The box body 2 and conforming box lid 1 can be designed in a variety of different configurations and box shapes and styles. FIGS. 1-5 show a more rounded embodiment; FIGS. 6 and 7 depict an embodiment of the invention featuring a more angular box profile. One skilled in the art would appreciate that the shape or specific dimensions of the device can vary and remain within the scope of this invention.

FIG. 6 also shows an embodiment of the device that provides to attachment with an anchoring object requiring a bottom support, such as when the device is used with a personal wheeled vehicle. FIG. 6(*a*) shows the perspective of the assembled device. The shackle 3 surrounds and draws a vertical anchoring object tightly into and against a support channel 5 in the box body 2 and holds it there until the shackle 3 is released from inside of the box body 2. As shown in FIG. 6(*b*), a support sleeve 9 is positioned to attach to the personal wheeled vehicle. The support sleeve may be in two equal and oppositely configured parts that each surround and contact a portion of the personal wheeled vehicle, or may be a single component that slides over or otherwise surrounds and adjustably secures the device to the personal wheeled vehicle. The support sleeve 9 further comprises a support sleeve post 10 with a support sleeve aperture 11 therethrough. A stabilizer 12 further comprising a stabilizer post 13 with an aperture therethrough is positioned in removeable contact with the support sleeve post, and their respective apertures are aligned and secured by passing and securing a stabilizer fastener 14 therein. The stabilizer is secured to the box body 2 in order to attach, stabilize and help secure it during use.

FIG. 7 show a perspective and an assembly view of an embodiment of the device for use with a personal wheeled vehicle. In FIG. 7(*a*), the box body 2 and box lid 1 are shown closed and locked, with the shackle 3 locked in place by the internal ratcheting means 8; the ratcheting means 8 contains a release component that is only accessible from inside the box body 2. To attach the device to the personal wheeled vehicle, a support sleeve 9 with an attached support sleeve post 10 interacts with a stabilizer 12 that is releasably connected with the box body 2. The support sleeve post 10 and the stabilizer 12 include apertures; when the support sleeve aperture 11 is aligned with the aperture on the stabilizer, a stabilizer fastener 14 can be passed through both apertures and secure them together. In this way the device can be securely and stably mounted to the personal wheeled vehicle. A loop lock 15 is shown in this figure; it serves to provide a closed area continuous with the support sleeve 9 to connect and lock the box body 2 to the support sleeve and therefore lock it to the personal wheeled vehicle. The loop lock 15 may connect at the shackle 3 by running the shackle 3 through the loop lock 15 when locking the device, or it may connect to a separate feature, loop or hook on the box body 2.

FIG. 7(*b*) is an exploded view of the embodiment presented in FIG. 7(*a*). In this embodiment, unlike the two-piece support sleeve 9 in FIGS. 6, the support sleeve 9 is a single piece that slides onto an anchoring object such as a personal wheeled vehicle seat post or scooter upright. The loop lock 15 is attached to or continuous with the support sleeve 9 at the support sleeve post 10. This can be fastened to the box body 2 by passing the shackle 3 through it as depicted in FIG. 7(*a*).

As shown in FIGS. 7, the box body 2 includes a bottom surface (not shown) with a portion conforming to the shape and size of the stabilizer 12. The stabilizer 12 further comprises a stabilizer post 13 with an aperture in it. A releasably attached support sleeve 9 including a support sleeve post 10 with a support sleeve aperture 11 is shaped and sized so that the stabilizer 12 is capable of engaging the support sleeve post 10 and the bottom surface of the box body 2 by fastening them with a stabilizer fastener 14. The stabilizer fastener 14 is threaded or geared to draw the support sleeve 9 tightly around the stabilizer 12 to support the device.

Figure 8A:
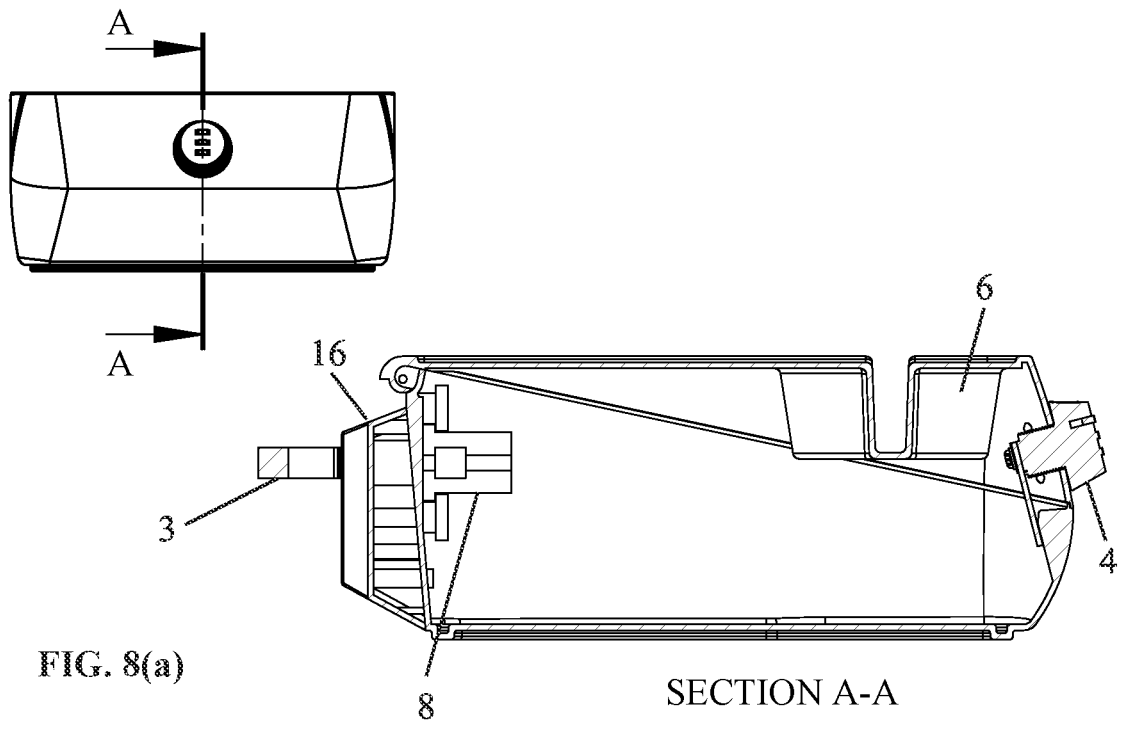
FIG. 8 (a) and (b) are cross sectional views of an embodiment of the device.
Figure 8B:
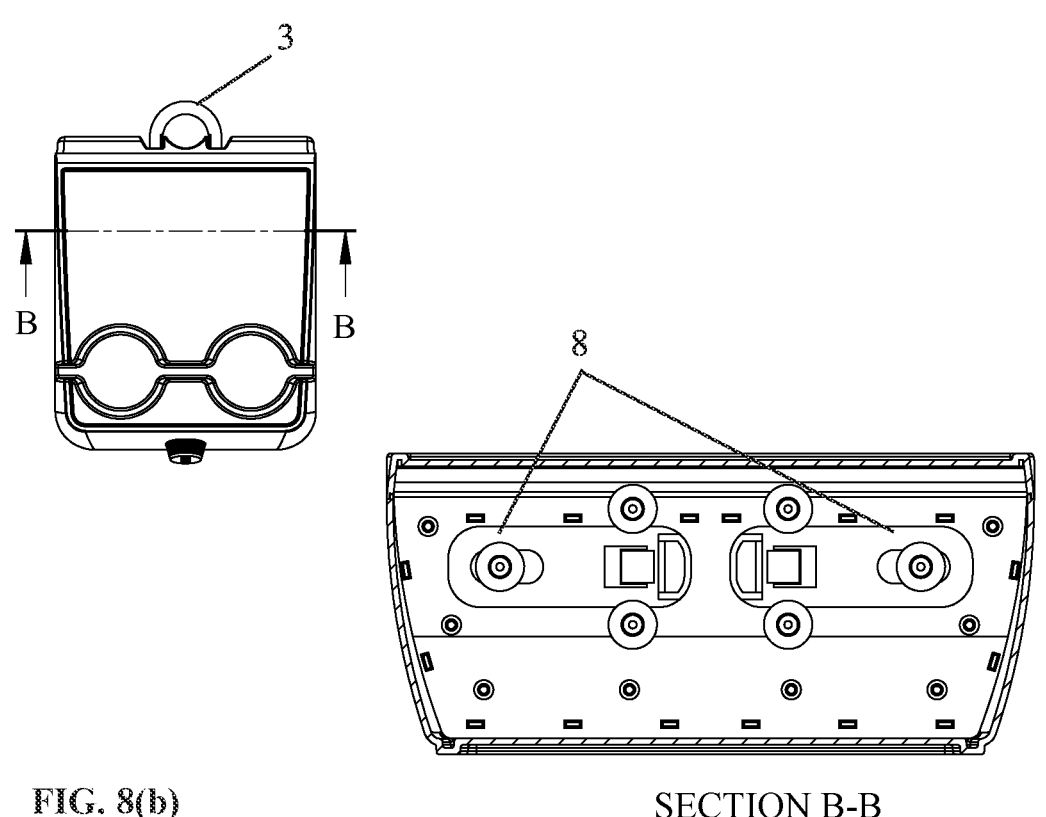

FIGS. 8A and B illustrate an embodiment of the device in cross section. In FIG. 8(*a*) the invention is sectioned through the front view to show the profile of the box body 2, including a cup support 6 and lock 4. In this view the hinged side of the device includes a panel 16; the shackle 3 is shown engaged, and the inside of the box body 2 can be seen. One of a plurality of sides of the box body 2 and any panel 16 attached thereto includes a plurality of apertures capable of receiving the shackle 3. Once the shackle 3 passes through these apertures, it interacts with a ratcheting means 8 inside of the box body 2. FIG. 8(*b*) shows the inside of the box body 2 cross section from the other direction, and illustrates an embodiment of a ratcheting means 8. This could include any number of mechanisms designed to capture, engage with and thereby tighten the shackle 3 to the box body 2 from the inside.

The invention disclosed herein further includes a method of using the device. The following steps are provided to show, generally the method; it will be appreciated that variations in the order of the steps could be made and remain within the scope of this invention.

For a vertical anchoring object:
1. lift the box body lid from the closed position on top of the box body to an open configuration;
2. position the box body so that the support channel is in contact with the anchoring object;
3. move the shackle around the anchoring device, and slide it into the box body through apertures capable of resisting impacts from weather, water and debris;
4. secure the shackle against the anchoring device and within the ratcheting means by applying pressure on the shackle to tighten the contact between the anchoring device and the device of the invention;
5. place personal items upon the box lid to use as a table or place them within the device to secure them;
6. lock or unlock the lock of the device during operation to safely store personal items and prevent theft;

7. unlock the locked device;
8. access and engage a release on the ratcheting means from inside the box body and release the shackle therefrom;
9. remove the shackle from inside of the box body and from around the anchoring device; and
10. remove personal items and optionally stack, if there are multiple devices, and store the invention.

For a personal wheeled vehicle, the method for using the device involves these steps:
1. Steps 1-10 above, and additionally:
2. engaging the device of claim 8 with a vertical component on a personal wheeled vehicle by surrounding at least a portion of a vertical component of the personal wheeled vehicle with the support sleeve;
3. securing and tightening the support sleeve against the vertical component of the personal wheeled vehicle;
4. connecting the support sleeve with a stabilizer by aligning the support sleeve aperture on the support sleeve post with an aperture on the stabilizer and passing and tightening a stabilizer fastener therethrough; and
5. connecting the stabilizer to the box body.

The invention also comprises a kit to carry, contain and store individual lockable storage and support devices. The kit comprises components of the invention including a weather and water resistant, portable, rigid, durable and locking storage box; a shackle capable of engaging with the storage box; one or more support sleeves in case one is misplaced or damaged; one or more stabilizers; a plurality of stabilizer fasteners, and a carry bag capable of containing all of these kit components.

We claim:
1. A device for storing and supporting personal items, the device comprising:
  i. a portable and lockable box that further comprises:
    a. a box lid with a sturdy, flat and non-flexible surface area capable of completely and securely covering the top of and conforming to the shape of a box body, and
    b. the box body connected with the box lid, the box body including one or more support channels capable of securely contacting an anchoring object;
  ii. a lock;
  iii. a shackle that is removeably insertable into the box body and connects with a ratcheting means therein to engage and secure the shackle to the anchoring object; and
  iv. the ratcheting means, wherein said ratcheting means is capable of matingly conforming to and engaging with the shackle to enable the device to be securely, removeably, and adjustably attached to the anchoring object;
  v. a bottom surface that includes a portion conforming to the shape and size of a stabilizer;
  vi. a stabilizer further comprising a stabilizer post and a stabilizer aperture in said stabilizer post;
  vii. a releasably attached support sleeve further comprising a support sleeve post with a support sleeve post aperture, wherein the stabilizer is capable of engaging the support sleeve post and the bottom surface of the box body by fastening them with a stabilizer fastener threaded or geared to draw the support sleeve tightly around the stabilizer to support the device; and
  viii. a loop lock continuous with or attached to the support sleeve and capable of engaging with the shackle to lock the device to a personal wheeled vehicle.

2. The device of claim 1 wherein the box body is connected to the box lid via one or more hinges such that the box lid can be opened, closed and locked by rotating the lid up or down relative to the box body and aligning the box body with the box lid so as to allow a lock to engage both the box body and the box lid and secure them together.

3. The device of claim 1, wherein the surface area contains one or more cup supports.

4. The device of claim 1, wherein the box lid or the box body includes speakers for amplifying and projecting sound from external devices.

5. The device of claim 1, wherein the box lid or the box body further comprises one or more of: solar panels for capturing power, batteries for storing power, lighting or light ports, and outlets for connecting power from and to external sources; and wherein power can be connected with the device and used for powering personal items.

6. The device of claim 1 wherein the box body and the box lid are shaped to conform to each other such that a plurality of the devices can be stacked upon each other for convenient shipping and storing.

7. The device of claim 1, wherein the box lid and the box body are weather and water resistant, and capable of safely storing contents against outdoor environmental impacts.

8. The device of claim 1 wherein the support sleeve is a single unit capable of surrounding an anchoring object by sliding onto it and releasably and securely fastening to it with a threaded or geared fastener by releasably connecting the support sleeve post with the stabilizer by aligning the apertures in the support sleeve post and the stabilizer post by passing a stabilizer fastener through the support sleeve post aperture in the support sleeve post and the aperture in the stabilizer post and securing said fastener therein.

9. The device of claim 1 wherein the support sleeve comprises two separate halves each capable of surrounding a portion of an anchoring object, and each half further comprises a support sleeve post with an aperture; the support sleeve post on each half of the support sleeve extends outward from the support sleeve and is releasably attached to the other half of the support sleeve and to the stabilizer by a fastener passing through each support sleeve post aperture and the stabilizer post aperture.

10. The device of claim 1 wherein the box body further comprises a plurality of sides, a bottom, and an open top conforming to the box lid; and wherein at least one side further comprises a panel capable of secure contact with at least one of the box body sides and also the anchoring object.

11. The device of claim 10 wherein the panel further comprises one or more support channels, groves, slides, or other formed or continuous structural areas that interact with the anchoring object.

12. The device of claim 11 wherein the one or more support channels are lined with a strip or section of rubber, silicon, or other sturdy but reflexive material by attaching it therein to the channel to help conform to the anchoring object.

13. The device of claim 1 wherein the ratcheting means contains a release component that is only accessible from inside the box body.

* * * * *